US010769732B2

(12) United States Patent
DeLuca et al.

(10) Patent No.: US 10,769,732 B2
(45) Date of Patent: Sep. 8, 2020

(54) EXPERTISE DETERMINATION BASED ON SHARED SOCIAL MEDIA CONTENT

(71) Applicant: International Business Machines Corporation, Armonk, NY (US)

(72) Inventors: Lisa Seacat DeLuca, Baltimore, MD (US); Dhanashree Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/708,228

(22) Filed: Sep. 19, 2017

(65) Prior Publication Data

US 2019/0087915 A1 Mar. 21, 2019

(51) Int. Cl.
| | |
|---|---|
| G06Q 50/00 | (2012.01) |
| G06Q 30/06 | (2012.01) |
| G06F 16/954 | (2019.01) |
| G06F 16/9535 | (2019.01) |

(52) U.S. Cl.
CPC .......... *G06Q 50/01* (2013.01); *G06F 16/954* (2019.01); *G06F 16/9535* (2019.01); *G06Q 30/0625* (2013.01); *G06Q 30/0631* (2013.01)

(58) Field of Classification Search
CPC .................................................. G06Q 50/01
USPC ...................................................... 705/26.62
See application file for complete search history.

(56) References Cited

U.S. PATENT DOCUMENTS

| | | | |
|---|---|---|---|
| 8,671,056 B1 * | 3/2014 | Whitney | G06Q 30/0631 705/44 |
| 10,007,936 B1 * | 6/2018 | Ghoshal | G06Q 50/01 |
| 2009/0157667 A1 * | 6/2009 | Brougher | G06F 16/958 |
| 2009/0249451 A1 * | 10/2009 | Su | G06Q 30/02 726/5 |
| 2013/0018957 A1 * | 1/2013 | Parnaby | G06Q 50/01 709/204 |
| 2013/0318156 A1 * | 11/2013 | Friedman | G06Q 50/01 709/203 |
| 2014/0081643 A1 * | 3/2014 | John | G10L 15/08 704/270 |
| 2014/0279232 A1 | 9/2014 | Lau et al. | |
| 2014/0280108 A1 * | 9/2014 | Dunn | G06F 16/335 707/728 |

(Continued)

OTHER PUBLICATIONS

Anonymous, IMshopping Expands Human Powered Recommendation Platform to Retailers and Etailers Online, Jun. 15, 2009, Business Wire, pp. 1-2. (Year: 2009).*

*Primary Examiner* — Jason B Dunham
*Assistant Examiner* — Brittany E Bargeon
(74) *Attorney, Agent, or Firm* — Schmeiser, Olsen & Watts, LLP; Stephanie Carusillo (57) ABSTRACT

An expertise determination system and method may include detecting that a user is searching a topic, based on an activity of the user over a network, analyzing a shared content from social contacts of the user shared on one or more social media platforms to determine that a context of a content shared by at least one social contact of the user correlates to the topic searched by the user, determining that the at least one social contact of the social contacts of the user is a potential expert on the topic, based on a correlation metric between the context of the content and the topic, and alerting the user of an identity of the at least one social contact.

11 Claims, 8 Drawing Sheets

(56) References Cited

U.S. PATENT DOCUMENTS

| | | | |
|---|---|---|---|
| 2015/0120713 A1* | 4/2015 | Kim | G06F 16/9535 |
| | | | 707/723 |
| 2016/0171588 A1* | 6/2016 | Linden | G06F 3/0488 |
| | | | 705/26.7 |
| 2016/0179805 A1* | 6/2016 | Bolshinsky | G06F 16/248 |
| | | | 707/723 |
| 2016/0203523 A1* | 7/2016 | Spasojevic | G06Q 30/0269 |
| | | | 705/14.66 |
| 2016/0292582 A1* | 10/2016 | Kozloski | G06Q 50/01 |
| 2017/0331916 A1* | 11/2017 | Banatwala | G06F 40/106 |

* cited by examiner

EXPERTISE DETERMINATION BASED ON SHARED SOCIAL MEDIA CONTENT

TECHNICAL FIELD

The present invention relates to systems and methods for determining expertise, and more specifically the embodiments of an expertise determination system for determining that a social contact is a potential expert on a topic.

BACKGROUND

When users are interested in purchasing a product or a service, or are making a decision on a particular matter/topic, the user typically conducts online research on that topic. As part of the online research, the user reads product reviews, performs comparisons, etc. In addition, users may also reach out to family, friends, and acquaintances regarding a recommendation.

SUMMARY

An embodiment of the present invention relates to a method, and associated computer system and computer program product, for expertise determination based on shared content. A processor of a computing system detects that a user is searching a topic, based on an activity of the user over a network. A shared content from social contacts of the user shared on one or more social media platforms is analyzed to determine that context of a content shared by at least one social contact of the user correlates to the topic searched by the user. At least one social contact of the social contacts of the user is determined to be a potential expert on the topic, based on a correlation metric between the context of the content and the topic. The user is alerted of an identity of the at least one social contact.

DETAILED DESCRIPTION

For users that prefer to receive a recommendation before making a decision or purchasing a product or good, must conduct online research, read product reviews, perform comparisons, and reach out to family, friends, and acquaintances regarding a recommendation. Currently, the process of determining who to reach out to is manual. Users may inadvertently omit reaching out to someone inside the user's social media network that could potentially be an expert on the topic that the user seeks a recommendation on.

Thus, there is a need for an expertise determination system for determining potential experts from shared social media content, and alerting the user.

Figure 1:
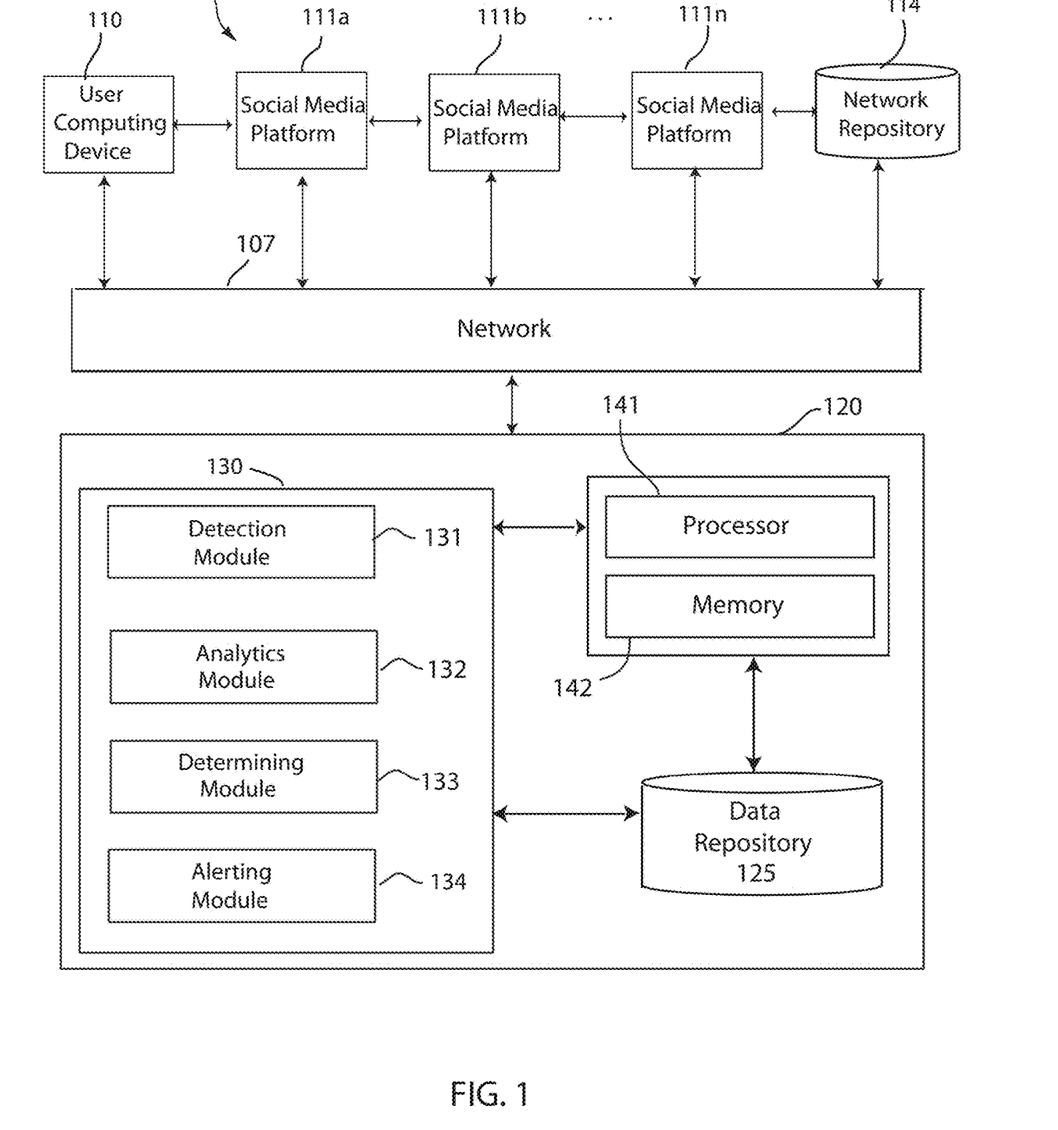
FIG. 1 depicts a block diagram of an expertise determination system, in accordance with embodiments of the present invention.

Referring to the drawings, FIG. 1 depicts a block diagram of expertise determination system 100, in accordance with embodiments of the present invention. Embodiments of the expertise determination system 100 may be a system for determining that a social contact within a user's social media network is or potentially is an expert on a topic. Embodiments of the expertise determination system 100 may be useful for users seeking guidance, recommendations, reviews, advice, etc. about a topic that the user is currently searching, researching, and the like. Topics may be related to at least one of: a product the user intends to purchase, a service the user intends to purchase, a service provider the user intends to hire, a location the user intends to visit, a job the user intends to perform, and the like.

Embodiments of the expertise determination system 100 may be a context-based expertise determination system, a social network expertise locating system, a social network expert matching system, a contextual shared content analytics system, an expert determination system, an expertise determination system, and the like. Embodiments of the expertise determination system 100 may include a computing system 120. Embodiments of the computing system 120 may be a computer system, a computer, a server, one or more servers, a cloud computing device, a hardware device, a remote server, and the like.

Furthermore, embodiments of expertise determination system 100 may include a user computing device 110 and one or more social media platforms 111a, 111b . . . 111n, communicatively coupled to a computing system 120 of the expertise determination system 100 over a network 107. For instance, information/data may be transmitted to and received from the user computing device 110 and the one or more social media platforms 111a, 111b . . . 111n over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (RAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing information of the user, user browsing search history, product information, social media activity, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user social media activity data, user searching history data, and the like, to generate both historical and predictive reports regarding a particular user or a user's search of a topic, and the like. In some embodiments, a data collection center housing the network repository 114 may include an analytic module capable of analyzing each piece of data being stored by the network repository 114. Further, the computing system 120 may be grated with or as a part of the data collection center housing the network repository 114. In some alternative embodiments, the network repository 114 may be a local repository that is connected to the computing system 120.

Embodiments of the user computing device 110 of the expertise determination system 100 may be a user device, a cell phone, a smartphone, a user mobile device, a mobile computer, a tablet computer, a PDA, a smartwatch, a dedicated mobile device, a desktop computer, a laptop computer, or other internet accessible device or hardware. Embodiments of the one or more social media platforms 111a, 111b ... 111n of the expertise determination system 100 may be one or more databases, storage devices, repositories, servers, computers, engines, and the like, that may service, run, store or otherwise contain information and/or data regarding a social media network of the user and the user's social contacts. The social media platform or platforms 111a, 111b ... 111n may be accessed or may share a communication link over network 107, and may be managed and/or controlled by a third party, such as a social media company. In an exemplary embodiment, the social media platforms 111a, 111b ... 111n may be a social media network, social media website, social media engine, and the like, which may store or otherwise contain content supplied by a social contract of the user.

Further, embodiments of the computing system 120 may be equipped with a memory device 142 which may store various data/information/code, and a processor 141 for implementing the tasks associated with the expertise determination system 100. In some embodiments, an expertise determination application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the expertise determination application 130. Embodiments of the expertise determination application 130 may be an interface, an application, a program, a module, or a combination of modules. In a exemplary embodiment, the expertise determination application 130 may be a software application running on one or more back end servers, servicing multiple computing devices.

The expertise determination application 130 of the computing system 120 may include a detection module 131, an analytics module 132, a determining module 133, and an alerting module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the detection module 131 may include one or more components of hardware and/or software program code for detecting that a user is searching a topic, based on an activity of the user over a network 107. For instance, embodiments of the detection module 131 may detect that the user is searching for information on a given topic (e.g., purchasing new hiking boots or taking a vacation to Las Vegas). In one embodiment, the user may be using a browser on the user computing device 110 to search the Internet for information on the topic, which may be detected by the detection module 131, or the user may enter one or more search terms within a search engine, which may be detected by the detection module 131. In another exemplary embodiment, the user may be searching for a product on a particular website, which may be detected by the detection module 131. In another embodiment, the detection module 131 may detect a user's activity on one or more social media platforms 111a, 111b ... 111c (e.g. a user posting about the desire to purchase new hiking boots or take a vacation to Las Vegas). In yet another embodiment, the detection module 131 may detect user searching activity from a combination of sources and methods to determine that the user is searching a particular topic.

Referring again to FIG. 1, embodiments of the computing system 120 may further include an analytics module 132. Embodiments of the analytics module 132 may include one or more components of hardware and/or software program code for analyzing a shared content from social contacts of the user shared on one or more social media platforms 111a, 111b ... 111c to determine that a context of a content shared by at least one social contact of the user correlates to the topic searched by the user. For instance, embodiments of the analytics module 132 may analyze a user's social media network via content shared by social contacts in the user' social media network on one or more social network platforms 111a, 111b ... 111c. The analytics module 132 may ascertain a context of the shared content, and then determine whether the context of the shared content correlates to the topic searched by the user. The shared content shared, uploaded, or otherwise posted on the social media platform 111a may be photographs, videos, comments made on other contacts' pages, text-based posts made to the social contact's own social media page, and the like. The shared content may be analyzed, parsed, scanned, searched, inspected, etc. for a context that correlates or otherwise relates to or is associated with the topic the user is searching. In an exemplary embodiment, the analytics module 132 may utilize a natural language technique to determine keywords associated with the content available on the social media platforms 111a, 111b ... 111c, and then examine the determined keywords with keywords that may be relatable with the topic or a product, location, service, service provider, etc. captured or otherwise encompassed by the topic. In another exemplary embodiment, the analytics module 132 may utilize an image or visual recognition engine to inspect, parse, scan, analyze, etc. a photograph, image, video, or other content to determine one or more descriptions or insights that describe or are associated with the photograph, image, video, or other content, and then examine the descriptions/insights with keywords that may be relatable with the topic or a product, location, service, service provider, etc. captured or otherwise encompassed by the topic. In yet another embodiment, the analytics module 132 may use a combination of natural language techniques, cognitive applications/engines, and visual recognition engines to determine a context of the shared content available on the one or more social media platforms 111a, 111b . . . 111c.

Moreover, embodiments of the analytics module 132 may compare the determined context from the shared content with the topic detected by the detection module 131. For instance, keywords, texts, insights, or other acquired computer readable information associated with the analyzed shared content may be compared with keywords, texts, insights, or other computer readable information associated with the topic (e.g. purchasing hiking boots) or a subject of the topic (e.g. hiking boots). Based on the comparison, the analytics module 132 may determine that the context of a particular social media content supplied by a particular social contact (e.g., friend, connection, follower, fan, member, etc. on a social media platform) may correlate to the topic or the subject of the topic that the user is currently searching for or has previously searched. In an exemplary embodiment, the analytics module 132 may not be looking for shared content regarding past purchases of the social contacts of the user. In this embodiment, the analytics module 132 need not analyze or locate specific products, topics, services, or even categories of the like to perform the analysis, but rather keywords associated with the shared content.

Figure 2:
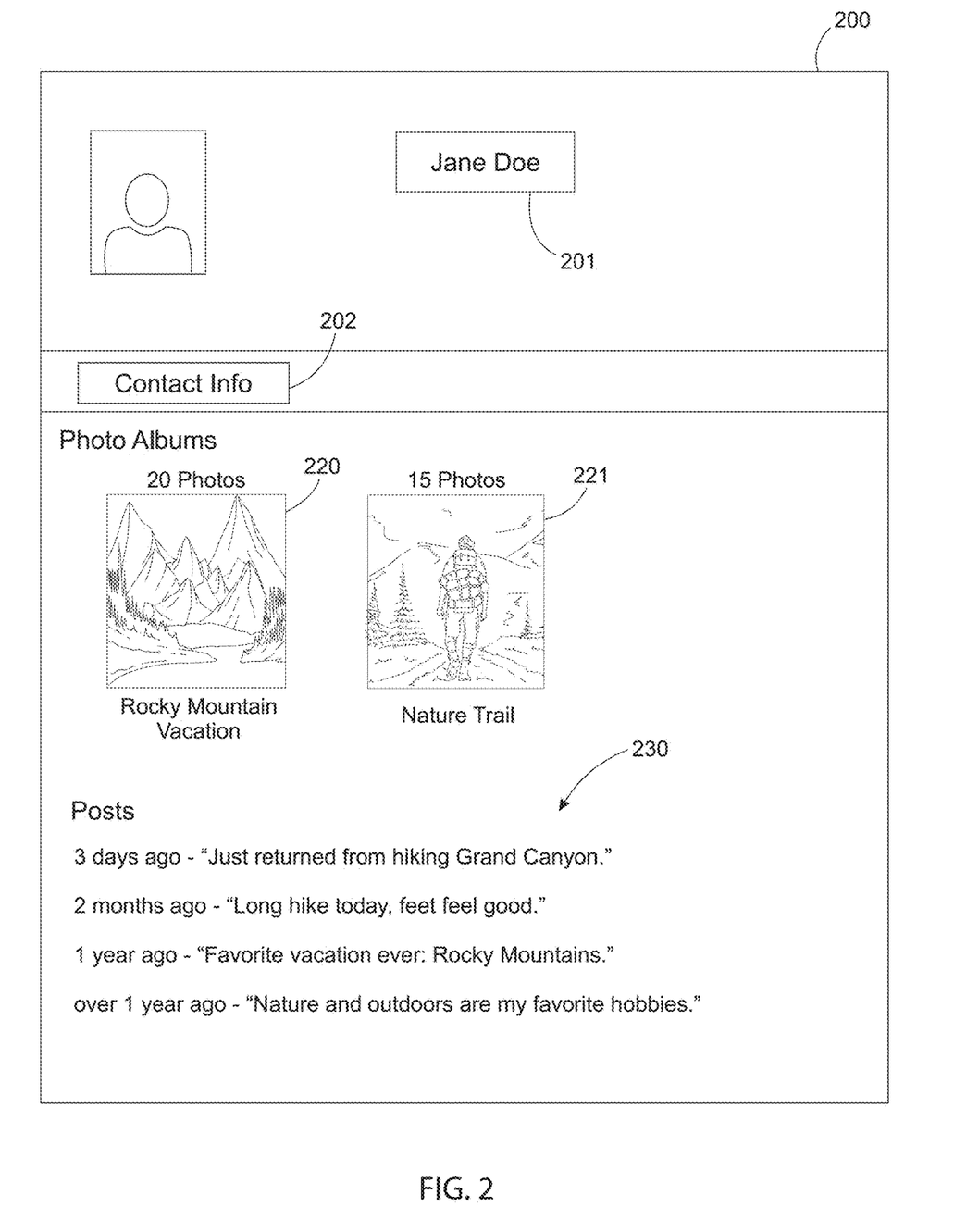
FIG. 2 depicts a first social media page of a social contact of a user containing shared content, in accordance with embodiments of the present invention.

Turning now to FIG. 2 for an example of analyzing a shared content from social contacts of the user shared on one or more social media platforms 111a, 111b . . . 111c to determine that a context of a content shared by at least one social contact of the user correlates to the topic searched by the user. FIG. 2 depicts a first social media page 200 of a social contact 201 of a user, containing shared content 220, 230, in accordance with embodiments of the present invention. In this example, the user is searching the Internet for "what hiking boots should I buy." The user has also visited a hiking boots seller's website, and posted on social media, "looking for new hiking boots!" The social contact 201 may be within the user's social media network on one or more social media platforms 111a, 111b . . . 111c. The social media page 200 may include a name or identity 201 of the social contact and contact information 202. The analytics module 132 has analyzed one or more social media platforms 111a, 111b . . . 111c and located social media page 200 as a potential context match with the topic. Here, the shared content includes two photo albums 220, 221 with multiple photographs. The first photo album 220 has a cover photo of a mountain. The analytics module 132 of the computing system 120 may determine (e.g. based on WATSON visual recognition and insights) that the cover photo is of a mountain, and the photographs of the album are mostly of mountains. The analytics module 132 may then correlate the mountains contained in the photographs (i.e. a context of the shared content) with hiking boots (i.e. subject of the topic). Similarly, the second photo album 221 has a cover photo of a person walking on a trail in the outdoors. The analytics module 132 of the computing system 120 may determine (e.g. based on WATSON visual recognition and insights) that the cover photo is of a person walking outside, and the photographs of the album are mostly of the social contact walking outside. The analytics module 132 may then correlate the social contact walking outside in many of the photographs (i.e. a context of the shared content) with hiking boots (i.e. subject of the topic). Furthermore, embodiments of the analytics module 132 may analyze comments 230 posted by the social contact on the social contact's social media page 200. In the comments, the social contact has posted text relating to "hiking," "Grand Canyon," "hike," "feet feel," "Rocky Mountains," "Nature," "Outdoor," and "hobbies." These keywords may be associated with a context of hiking, which can correlate to the purchasing new hiking boots. In the example of FIG. 2, it may not be necessary that the social contact's social media page includes any shared content on a specific hiking boot or brand of hiking boot, because the analytics module 132 may analyze the context of the shared content.

Figure 3:
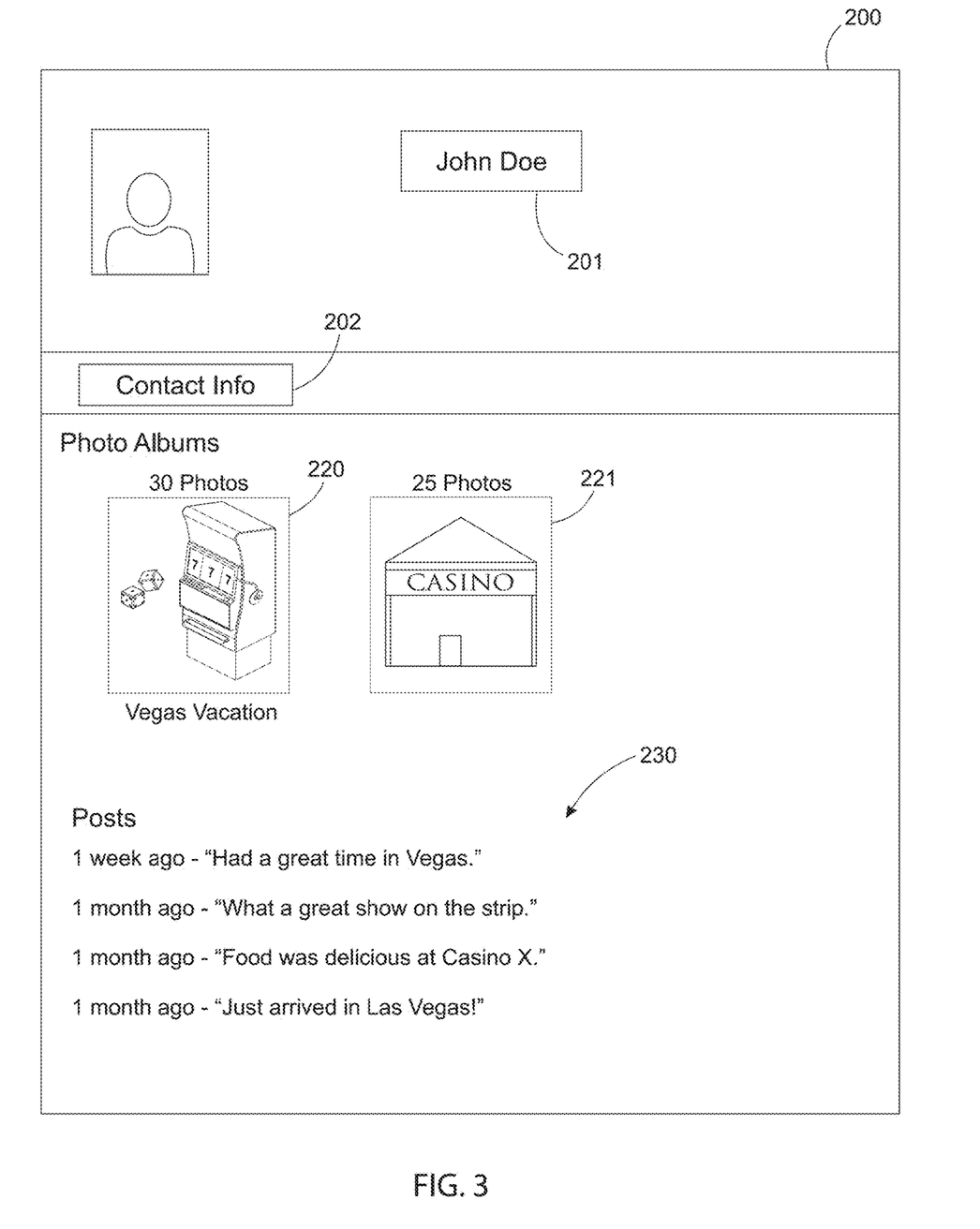
FIG. 3 depicts a second social media page of a social contact of a user, containing shared content, in accordance with embodiments of the present invention.

Turning now to FIG. 3 for another example of analyzing a shared content from social contacts of the user shared on one or more social media platforms 111a, 111b . . . 111c to determine that a context of a content shared by at least one social contact of the user correlates to the topic searched by the user. FIG. 3 depicts a second social media page 200 of a social contact 201 of a user, containing shared content 220, 230, in accordance with embodiments of the present invention. In this example, the user is searching the Internet for "vacationing in Las Vegas." The user has also visited a travel planner company's website, and posted on social media, "looking for forward to my next vacation!" The social contact 201 may be within the user's social media network on one or more social media platforms 111a, 111b . . . 111c. The social media page 200 may include a name or identity 201 of the social contact and contact information 202. The analytics module 132 has analyzed one or more social media platforms 111a, 111b . . . 111c and located social media page 200 as a potential context match with the topic. Here, the shared content includes two photo albums 220, 221 with multiple photographs. The first photo album 220 has a cover photo of slots and dice. The analytics module 132 of the computing system 120 may determine (e.g. based on WATSON visual recognition and insights) that the cover photo is of a casino slots and gambling, and the photographs of the album are mostly of a person inside of hotel. The analytics module 132 may then correlate the casino slots and gambling dice contained in the photographs (i.e. a context of the shared content) with vacationing in Las Vegas (i.e. the topic). Similarly, the second photo album 221 has a cover photo of a casino resort hotel. The analytics module 132 of the computing system 120 may determine (e.g. based on WATSON visual recognition and insights) that the cover photo is of a hotel and casino, and the photographs of the album are mostly of casino exteriors. The analytics module 132 may then correlate the casinos in many of the photographs (i.e. a context of the shared content) with vacationing in Las Vegas (i.e., subject of the topic). Furthermore, embodiments of the analytics module 132 may analyze comments 230 posted by the social contact on the social contact's social media page 200. In the comments, the social contact has posted text relating to "great time," "Vegas," "show," "Strip," "Casino X," and "Las Vegas." These keywords may be associated with a context of vacationing in Las Vegas, which can correlate to taking a vacation to the city of Las Vegas.

Referring back to FIG. 1, embodiments of the computing system 120 may include a determining module 133. Embodiments of the determining module 133 may include one or more components of hardware and/or software program code for determining that the at least one social contact of the social contacts of the user is a potential expert on the topic, based on a correlation metric between the context of the content and the topic. For instance, embodiments of the determining module 133 may determine that a social contact is a potential expert, is an expert, or a recommended source for information and/or advice about the topic, in response to the analyzing by the analytics module 132. The determining module 133 may utilize a correlation metric to determine whether a correlation between a context of the shared content and the topic and the subject of the topic exceeds a threshold of a confidence level pertaining to a knowledge and/or experience to conclude that the social contact is an expert or potential expert on the topic. Embodiments of the correlation metric may define the confidence level that the at least one social contact has expertise on the topic or the subject of the topic.

Embodiments of the correlation metric may be calculated based on a plurality of factors. Embodiments of the plurality of factors may include a frequency of contextually related content posted by the at least one social contact, a date of the content posted on the one or more social media networks, a range of dates of the content measured from a present time, a total number of contextually related content posted by the at least social one contact, a similarity between a purchase behavior of the at least one social contact and the user, a demographic of the at least one user compared to a demographic of the user, a profession of at least one social contact, a personality of the at least one social contact as compared to the user, and the like.

Embodiments of the determining module 133 may analyze the plurality of factors to determine a confidence level or correlation metric relating to whether the social contact is a potential expert on the topic. The confidence level may increase if the social contact has made more frequent posts of contextually related content, the posts are more recent, the posts have been occurring for a longer range of time, the social contact matches a demographic of the user, the social contact makes similar purchases, and the like. The confidence level may decrease if the social contact has made less frequent posts of contextually related content, the posts are less recent or outdated, the posts have been occurring for only a short period of time, the social contact is a different demographic of the user, the social contact makes less similar purchases, and the like. A threshold of a confidence level may vary depending on the topic, and may be predetermined by the computing system 120. If the determining module 133 calculates a correlation metric associated with the social contact, and the correlation metric exceeds a confidence level threshold, then the determining module 133 may determine that the social contact is a potential expert on the topic or the subject of the topic.

Referring back to the example shown in FIG. 2, the determining module 133 may calculate a correlation metric of social contact 201 on the topic of purchasing new hiking boots. Here, the comments 230 are recent (e.g. 3 days ago, 2 months ago), as well as dating back to over one year ago. The total number of photographs that contain contextually related content is 35. Therefore, the determining module 133 may determine that social contact 201 may be a potential expert on the topic of hiking boots, based on the correlation metric calculated for social contact 201 that denotes a high confidence level exceeding a predetermined threshold. Similarly, in the example shown in FIG. 3, the determining module 133 may calculate a correlation metric of social contact 201 on the topic of vacationing to Las Vegas. Here, the comments 230 are very recent (e.g. 1 week ago, 1 month ago), as well a concentrated number of posts contextually related to vacationing in Las Vegas. The total number of photographs that contain contextually related content is 55. Therefore, the determining module 133 may determine that social contact 201 may be a potential expert on the topic of vacationing in Las Vegas, based on the correlation metric calculated for social contact 201 that denotes a high confidence level exceeding a predetermined threshold.

Embodiments of the computing system 120 of the expertise determination system 100 may be equipped with a memory device 142 which may store the user data, social network data, and/or user data, and a processor 141 for implementing the tasks associated with the computing system 120. Furthermore, various tasks and specific functions of the modules of the computing system 120 may be performed by additional modules, or may be combined into other module(s) to reduce the number of modules.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the expertise determining system 100 may improve search engine technology by offering a method to connect resources to a user device, as well as online transaction technology and expert evaluation and identification technology, utilizing hardware to intelligently connect users over the network and evaluate expertise on a given subject. Embodiments of the expertise determining system 100 may further determine which social contact may be an expert based on a an individual user. Thus, the expertise determination of social contacts may be individualized to each user/user device, which is being used to capture the searching activity of the user.

Figure 4:
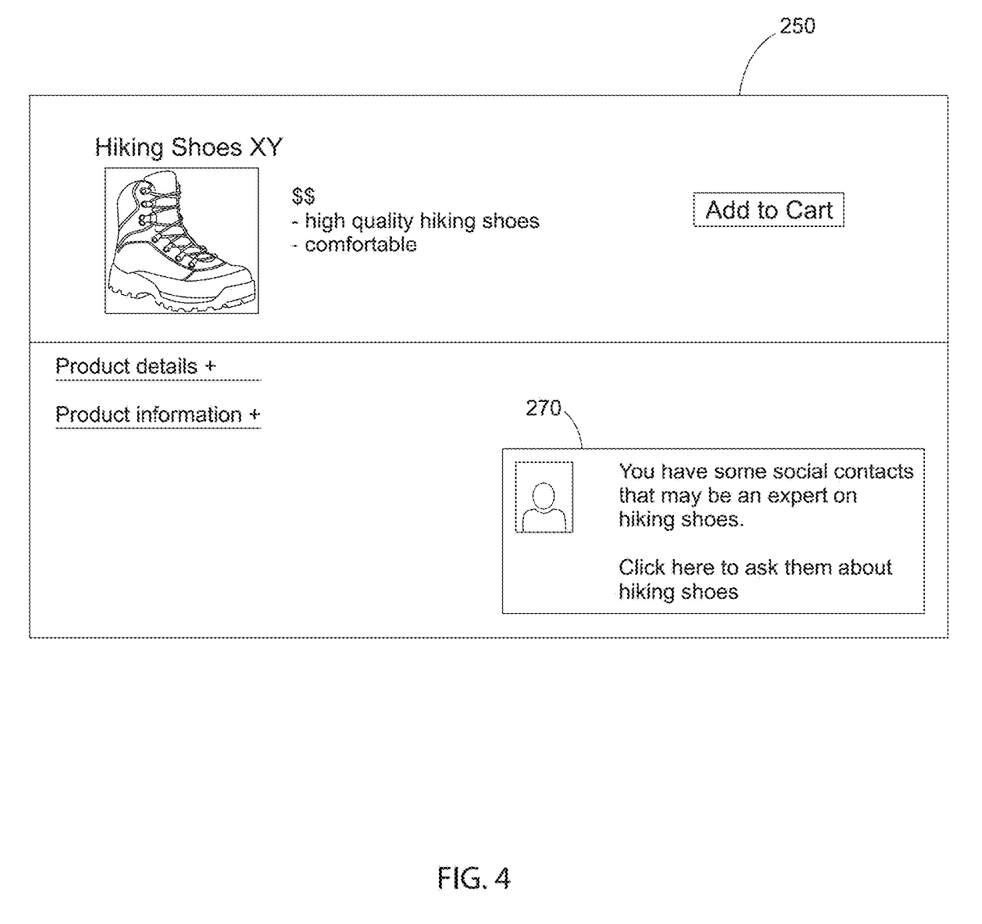
FIG. 4 depicts a webpage point of sale for a product, wherein a social contact is displayed a potential expert within the social network of a user, in accordance with embodiments of the present invention.

Referring back to FIG. 1, embodiments of the computing system 120 may include an alerting module 134. Embodiments of the alerting module 134 may include one or more components of hardware and/or software program code for alerting the user of an identity of the at least one social contact determined to be a potential expert. For instance, embodiments of the alerting module 134 may notify or otherwise alert the user to the identity of one or more social contacts determined to be a potential expert, expert, reliable source of information, recommended source of advice, and the like, on the subject and/or the topic. By alerting the user, the user may then know which person in the user's social network to contact regarding advice, opinions, expertise, and the like, on the topic that the user is searching. In an exemplary embodiment, the alerting module 134 may display the identity of the at least one social contact on a webpage proximate product information located on the webpage. FIG. 4 depicts a webpage point of sale for a product hiking boots), wherein a social contact is displays a potential expert within the social network of a user, in accordance with embodiments of the present invention. Here, the point of sale webpage or a webpage 250 containing a product displays information about the potential expert 270 proximate the product or product information. The user may then click a link on the webpage 270 to prompt a message sending application to message the social contact determined to be a potential expert on the subject/topic of hiking boots. Moreover, the alerting module 134 may also display a confidence in the expertise of the at least one social contact and/or an evidence of the expertise of the least one social contact, proximate the product information. For instance, if the computing system 120 determines a confidence level of 70%, that the at least one social contact is an expert, the confidence as represented by the percentage may be displayed on the webpage. Further, the alerting module 134 may display the reason for the confidence score proximate the product information. For example, the alerting module 134 may display a picture from the at least one social contact's social media page on the webpage with the product being sold, wherein the displayed picture was used by the analyzing module 132 to determine that the at least one social contact may be a potential expert. The alerting module 134 may alternatively display one or more relevant messages from the at least one social contact's social media page as evidence. For example, the alerting module 134 may display a "tweet" where a social contact posted, "I love Brand X hiking shoes. Alternatively, embodiments of the alerting module 134 may send the user a notification or message to the user's computing device 110, the user's mobile phone, or may send an email to the user's email.

Furthermore, the alerting module 134 may track expert recommendations and create a measurable counter to indicate that the social contact's recommendation was helpful to the user. The measure counter may be stars, likes, etc. that is viewable to the next user so that the next user can gauge the helpfulness of the social contact as an expert on a particular topic. In even further embodiments, the alerting module 134 may coordinate an incentive or reward to the social contact that has supplied the recommendation for a particular product from the particular retailer or seller of the product. For example, if the social contact provides the social contact's expert opinion that Brand XY hiking boots are recommended to the user, the alerting module 134 may coordinate a reward from the hiking boots retailer/seller/manufacturer to the social contact.

Figure 5:
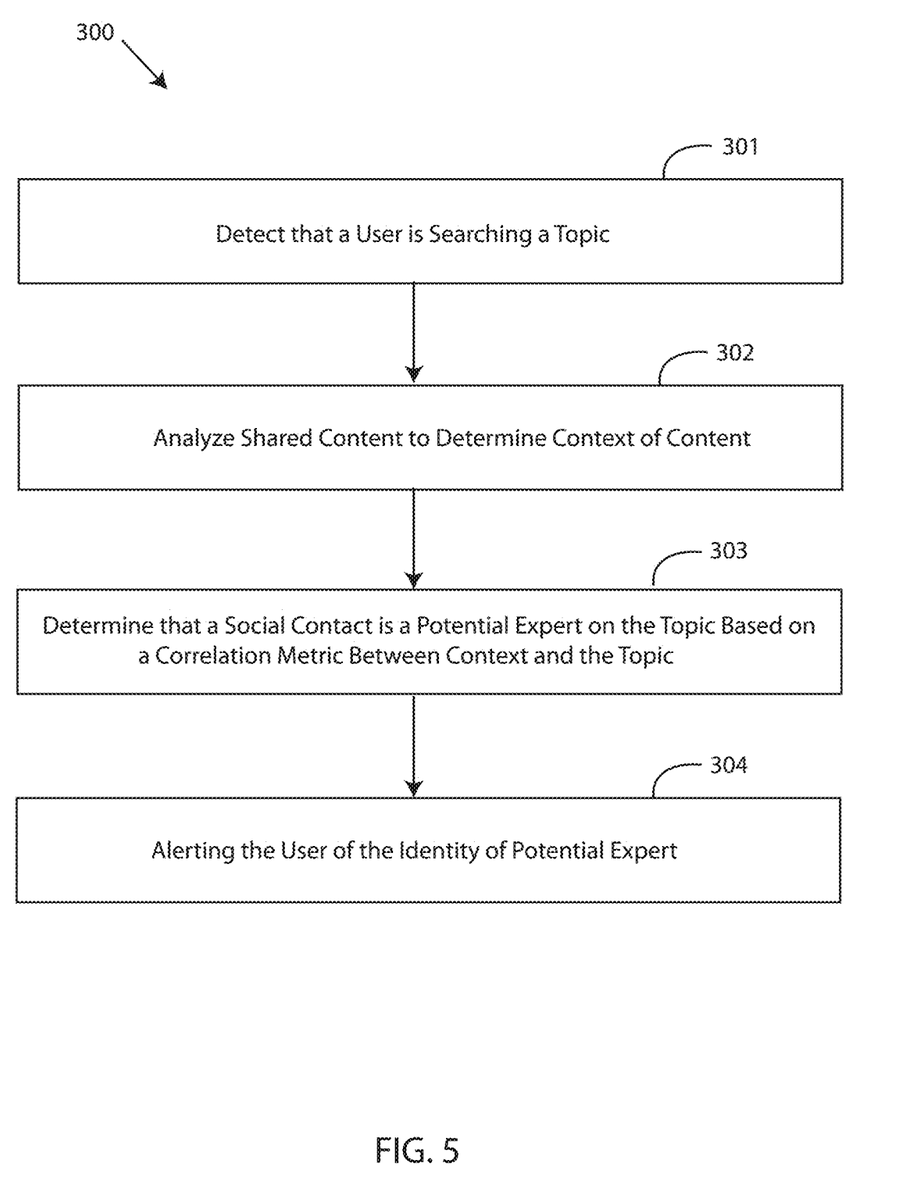
FIG. 5 depicts a flow chart of a method for expertise determination based on shared content, in accordance with embodiments of the present invention.

Referring now to FIG. 5, which depicts a flow chart of a method 300 for expertise determination based on shared content, in accordance with embodiments of the present invention. One embodiment of a method 300 or algorithm that may be implemented for expertise determination based on shared content with the expertise determination system 100 described in FIGS. 1-4 using one or more computer systems as defined generically in FIG. 6 below, and more specifically by the specific embodiments of FIG. 1.

Embodiments of the method 300 for expertise determination based on shared content, in accordance with embodiments of the present invention, may begin at step 301 wherein a user searching a topic is detected. The user may be searching on a computing device for purchasing an item, to learn how to fix a leaky pipe, to hire a plumber, etc., the search topic being detected by the system computing system 120. Step 302 analyzes shared content of social contacts within the user's social network to determine a context of the shared context. Step 303 determines that at least one social contact within the social network of the user is a potential expert on the topic based on a correlation metric between the context of the shared content and the topic. For example, the computing system 120 may calculate a correlation metric to determine that, based on a context of the shared content shared on social media by at least one social contact, the social contact is a potential expert on the topic that the user is or has previously searched for over the Internet. Step 304 alerts the user to the identity of the potential expert so that the user knows that the identified social contact may be a good and reliable recommendation, and can reach out to the social contact for a recommendation.

Figure 6:
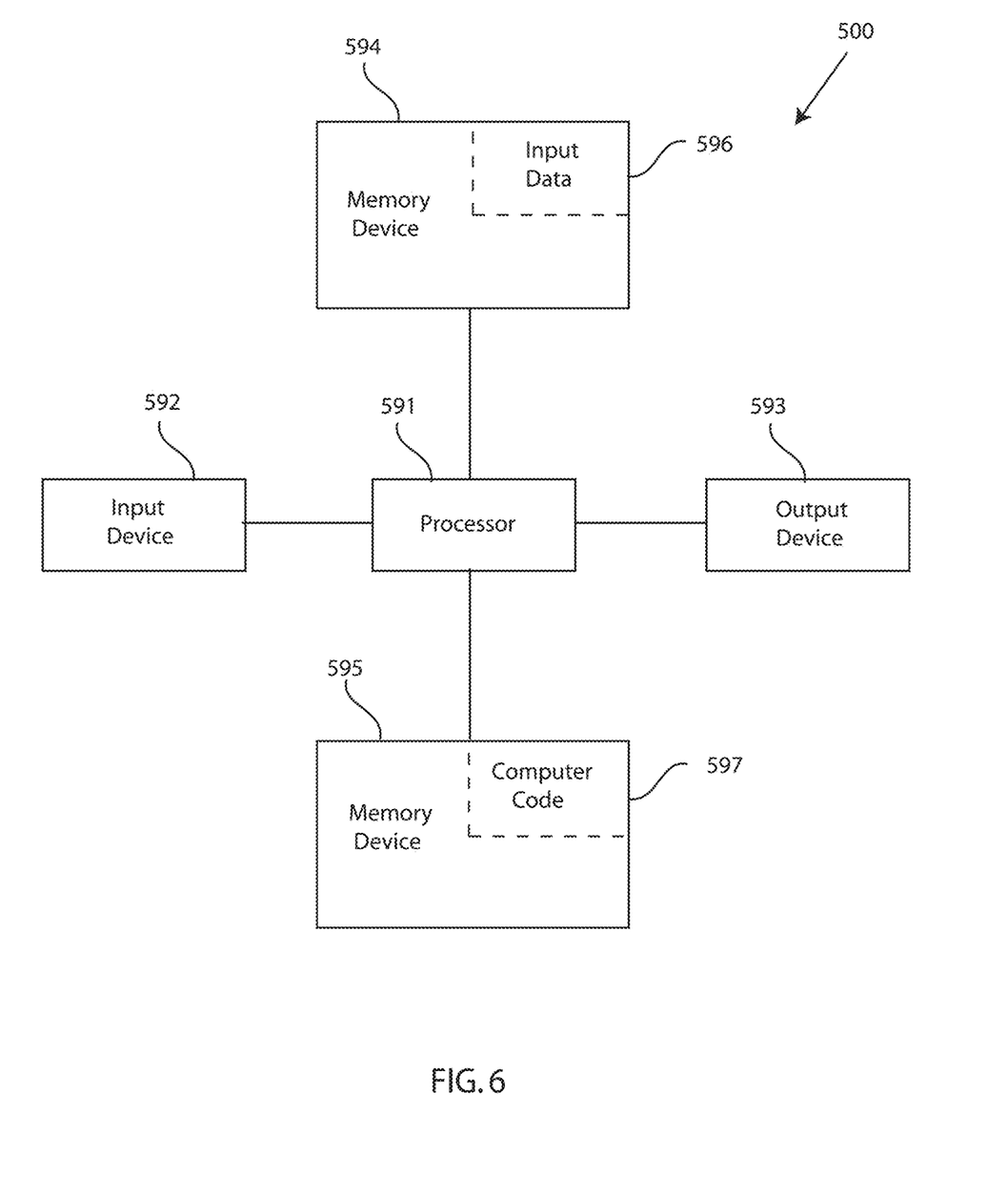
FIG. 6 depicts a block diagram of a computer system for the expertise determination system of FIGS. 1-4, capable of implementing methods for expertise determination based on shared content of FIG. 5, in accordance with embodiments of the present invention.

FIG. 6 depicts a block diagram of a computer system for the expertise determination system of FIGS. 1-4, capable of implementing methods for expertise determination based on shared content of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for expertise determination based on shared content in the manner prescribed by the embodiments of FIG. 5 using the expertise determination system 100 of FIGS. 1-4, wherein the instructions of the computer code 597 may be executed by processor 591 via memory device 595. The computer code 597 may include software or program instructions that may implement one or more algorithms for implementing the for expertise determination based on shared content, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a corrupter program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to for determine expertise based on shared content. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for expertise determination based on shared content. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for expertise determination based on shared content.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
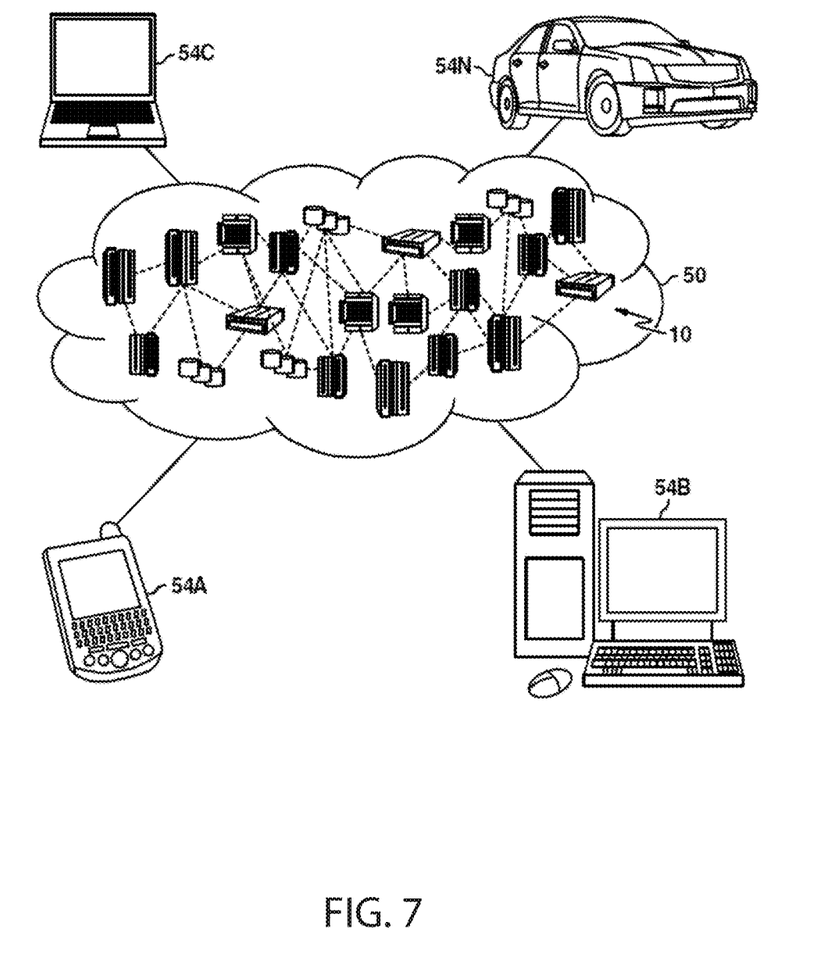
FIG. 7 depicts a cloud computing environment in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
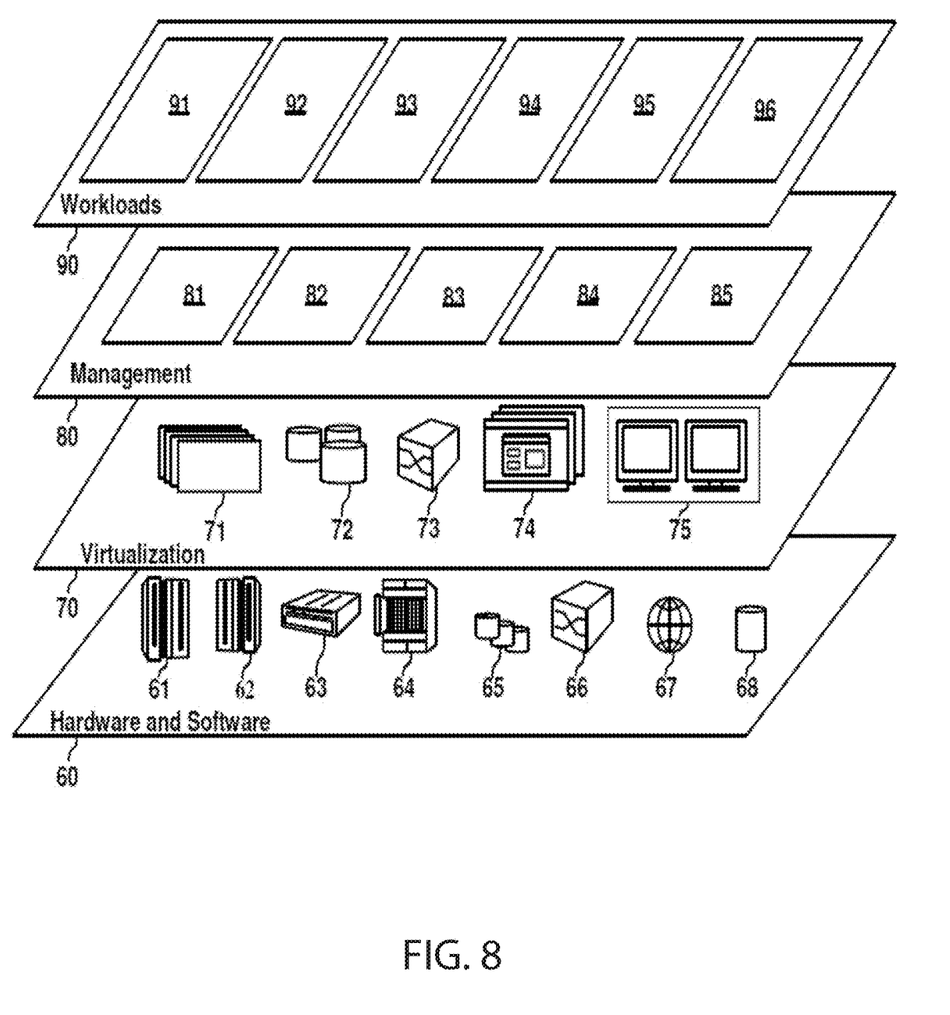
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and expertise determination 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method comprising:
    Detecting, by a processor of a computing system, that a user is searching a topic, based on an activity of the user over a network;
    Scanning, by the processor, a plurality of social media pages of a plurality of social contacts of the user across one or more social media platforms;
    Locating, by the processor, a social media page of a social contact of the user, in which a context of content of the social media page correlates to the topic, the locating being a function of scanning the social media page using a combination of a natural language technique and a visual recognition engine to determine that the context of the content available on the social media page correlates to the topic, wherein the natural language technique scans text of the content available on the social media page to identify one or more keywords relevant to the topic and the visual recognition engine scans photographs of the content available on the social media page to identify objects in the photographs that correlate to the topic;
    Determining, by the processor, that the social contact is a recommended source for information on the topic, based on a correlation between the context of the content and the topic exceeding a threshold of a confidence level that the social contact has expertise on the topic; and alerting, by the processor, the user of an identity of the social contact by inserting a link to a messaging application for messaging the social contact, the link being inserted on a point of sale webpage external to the one or more social media platforms.

2. The method of claim 1, wherein the confidence level is determined by analyzing a plurality of factors, the plurality of factors including a frequency of contextually related content posted by the social contact, a date of the content posted on the one or more social media platforms, a range of dates of the content measured from a present time, a total number of contextually related content posted by the social contact, a similarity between a purchase behavior of the social contact and the user, a profession of the social contact, and a personality of the social contact as compared to the user.

3. The method of claim 1, wherein alerting also includes displaying, by the processor, the identity of the social contact on the point of sale webpage proximate product information located on the point of sale webpage.

4. The method of claim 1, wherein the topic relates to at least one of: a product the user intends to purchase, a service the user intends to purchase, a service provider the user intends to hire, a location the user intends to visit, and a job the user intends to perform.

5. A computer system, comprising:

A processor;

A memory device coupled to the processor; and

A computer readable storage device coupled to the processor, wherein the storage device contains program code executable by the processor via the memory device to implement a method for expertise determination based on shared content, the method comprising:

Detecting, by the processor, that a user is searching a topic, based on an activity of the user over a network;

Scanning, by the processor, a plurality of social media pages of a plurality of social contacts of the user across one or more social media platforms;

Locating, by the processor, a social media page of a social contact of the user, in which a context of content of the social media page correlates to the topic, the locating being a function of scanning the social media page using a combination of a natural language technique and a visual recognition engine to determine that the context of the content available on the social media page correlates to the topic, wherein the natural language technique scans text of the content available on the social media page to identify one or more keywords relevant to the topic and the visual recognition engine scans photographs of the content available on the social media page to identify objects in the photographs that correlate to the topic;

Determining, by the processor, that the social contact is a recommended source for information on the topic, based on a correlation between the context of the content and the topic exceeding a threshold of a confidence level that the social contact has expertise on the topic; and alerting, by the processor, the user of an identity of the social contact by inserting a link to a messaging application for messaging the social contact, the link being inserted on a point of sale webpage external to the one or more social media platforms.

6. The computer system of claim 5, wherein the confidence level is determined by analyzing a plurality of factors, the plurality of factors including a frequency of contextually related content posted by the social contact, a date of the content posted on the one or more social media platforms, a range of dates of the content measured from a present time, a total number of contextually related content posted by the social contact, a similarity between a purchase behavior of the social contact and the user, a profession of the social contact, and a personality of the social contact as compared to the user.

7. The computer system of claim 5, wherein alerting also includes displaying, by the processor, the identity of the social contact on the point of sale webpage proximate product information located on the point of sale webpage.

8. The computer system of claim 5, wherein the topic relates to at least one of: a product the user intends to purchase, a service the user intends to purchase, a service provider the user intends to hire, a location the user intends to visit, and a job the user intends to perform.

9. A computer program product, comprising a non-transitory computer readable hardware storage device storing a computer readable program code, the computer readable program code comprising an algorithm that when executed by a processor of a computing system implements a method for expertise determination based on shared content, the method comprising:

Detecting, by the processor, that a user is searching a topic, based on an activity of the user over a network;

Scanning, by the processor, a plurality of social media pages of a plurality of social contacts of the user across one or more social media platforms;

Locating, by the processor, a social media page of a social contact of the user, in which a context of content of the social media page correlates to the topic, the locating being a function of scanning the social media page using a combination of a natural language technique and a visual recognition engine to determine that the context of the content available on the social media page correlates to the topic, wherein the natural language technique scans text of the content available on the social media page to identify one or more keywords relevant to the topic and the visual recognition engine scans photographs of the content available on the social media page to identify objects in the photographs that correlate to the topic;

Determining, by the processor, that the social contact is a recommended source for information on the topic, based on a correlation between the context of the content and the topic exceeding a threshold of a confidence level that the social contact has expertise on the topic; and alerting, by the processor, the user of an identity of the social contact by inserting a link to a messaging application for messaging the social contact, the link being inserted on a point of sale webpage external to the one or more social media platforms.

10. The computer system of claim 9, wherein the confidence level is determined by analyzing a plurality of factors, the plurality of factors including a frequency of contextually related content posted by the social contact, a date of the content posted on the one or more social media platforms, a range of dates of the content measured from a present time, a total number of contextually related content posted by the social contact, a similarity between a purchase behavior of the social contact and the user, a profession of the social contact, and a personality of the social contact as compared to the user.

11. The computer program product code of claim 9, wherein alerting also includes displaying, by the processor, the identity of the social contact on the point of sale webpage proximate product information located on the point of sale webpage.

* * * * *